United States Patent
Westfal et al.

(10) Patent No.: US 10,537,970 B2
(45) Date of Patent: Jan. 21, 2020

(54) MACHINE TOOL FOR THE EDGE MACHINING OF A WORKPIECE

(71) Applicant: Ledermann GmbH & Co. KG, Horb am Neckar (DE)

(72) Inventors: Ewald Westfal, Geislingen (DE); Oliver Galli, Nufringen (DE); Paul Goetz, Horb-Diessen (DE); Andreas Kreidler, Tuebingen (DE); Ralf Kreidler, Empfingen (DE)

(73) Assignee: Ledermann GmbH & Co. KG, Horb am Neckar (DE)

( * ) Notice: Subject to any disclaimer, the term of this patent is extended or adjusted under 35 U.S.C. 154(b) by 165 days.

(21) Appl. No.: 15/847,441

(22) Filed: Dec. 19, 2017

(65) Prior Publication Data
US 2018/0169810 A1  Jun. 21, 2018

(30) Foreign Application Priority Data
Dec. 19, 2016  (EP) .................................. 16002692

(51) Int. Cl.
*B27G 13/08* (2006.01)
*B23Q 11/00* (2006.01)
(Continued)

(52) U.S. Cl.
CPC ............ *B23Q 11/0046* (2013.01); *B27C 5/04* (2013.01); *B27F 1/02* (2013.01); *B27G 13/08* (2013.01)

(58) Field of Classification Search
CPC .. B27C 5/04; B27C 5/06; B27G 13/08; B27B 5/04; B27B 33/20
See application file for complete search history.

(56) References Cited

U.S. PATENT DOCUMENTS 5,452,752 A * 9/1995 Aigner ..................... B23Q 1/28
144/48.6
5,482,098 A * 1/1996 Loppnow ............... B23Q 3/002
144/134.3
8,074,688 B2 12/2011 Beyeler et al.

FOREIGN PATENT DOCUMENTS

CN  201471544 U  5/2010
CN  201998241 U  10/2011
(Continued)

OTHER PUBLICATIONS

First Office action of the Chinese Patent Office dated Sep. 30, 2019 in corresponding Chinese patent application No. 201711375847.8.

*Primary Examiner* — Matthew Katcoff
(74) *Attorney, Agent, or Firm* — Walter Ottesen, P.A.

(57) ABSTRACT

The invention is directed to a machine tool for edge machining a workpiece. The machine tool includes a drive unit for a rotary tool, a guide device for guiding the workpiece in a horizontal infeed direction and a chip collecting hood. The guide device includes an upper pressure element and a lower pressure element and one of the pressure elements is settable in the vertical direction relative to the other pressure element and also the drive unit. The chip collecting hood includes a side wall having a cutout for receiving an edge region to be machined of the workpiece. The side wall includes a base wall part and a closure wall part. The base wall part is positioned fixedly relative to the drive unit and the closure wall part is positioned fixedly relative to the pressure element to be settable in the vertical direction. The closure wall part delimits the cutout in the vertical direction.

6 Claims, 2 Drawing Sheets

(51) Int. Cl.
*B27C 5/04* (2006.01)
*B27F 1/02* (2006.01)

(56) References Cited

FOREIGN PATENT DOCUMENTS

| | | | |
|---|---|---|---|
| CN | 104002342 | A | 8/2014 |
| DE | 1287788 | B | 1/1969 |
| DE | 3317409 | A1 | 11/1984 |
| EP | 0426613 | A2 | 5/1991 |

\* cited by examiner

MACHINE TOOL FOR THE EDGE MACHINING OF A WORKPIECE

CROSS REFERENCE TO RELATED APPLICATION

This application claims priority of European patent application no. 16 002 692.8, filed Dec. 19, 2016, the entire content of which is incorporated herein by reference.

FIELD OF THE INVENTION

The invention relates to a machine tool for the edge machining of a workpiece.

BACKGROUND OF THE INVENTION

The edge machining of workpieces made of wood or wood-like material such as chipboards, floor panels or the like is associated with a high degree of chip production. The chips have to be removed as promptly and completely as possible from the point of origin, that is, from where the tool cutting edges come into engagement with the workpiece edge, and carried away. Otherwise, they can have various disadvantageous effects, such as multiple chipping, development of heat, formation of impressions on the workpiece surface or the like.

Guide devices for guiding the workpiece along the circumferential contour of the rotary tool are provided in the prior art. Such guide devices comprise at least two pressure elements that are located opposite one another in a vertical direction, specifically an upper pressure element and a lower pressure element, between which the workpiece is held and guided. At least one of the two pressure elements is settable in the vertical direction relative to the respective other pressure element and also relative to the drive unit, in order that the desired edge profile arises at the right point on the workpiece.

Furthermore, use is made of chip collecting hoods which are fastened to the drive unit and cover the tool and the cutting region. A connected suction fan is intended to extract the chips in a controlled manner. A machine tool having such a chip collecting hood is known from U.S. Pat. No. 8,074,688. Therein, the edge of a workpiece is machined by upcut milling by means of a rotary tool. The rotary milling tool and also the edge region of the workpiece are enclosed virtually tightly by the chip collecting hood in order to ensure good extraction. In particular that region of the hood that immediately adjoins the workpiece edge is problematic. Not only does the chip collecting hood have to allow the workpiece to be guided up to the cutting region of the rotary tool, the hood also has to reach as close as possible to the workpiece surface in order to prevent chips escaping in an undesired manner there. For this purpose, the side wall of the chip collecting hood has a cutout which encloses the cross section of the workpiece edge with a slight gap.

In upcut operation, the chips removed from the workpiece are flung away at an oblique angle relative to the workpiece edge. A considerable proportion of the flung-away chips does not directly reach the abovementioned gap and can be extracted. However, it is not possible to prevent a certain proportion of chips from passing out undesirably through the gap. This problem is even more pronounced when the machine works in downcut operation. In this case, the removed chips are flung away substantially parallel to the workpiece edge immediately after they have been produced, with the consequence that they reach the gap more or less directly in a high concentration and can emerge there.

In practical operation, such machine tools have to be able to be operated universally and are therefore provided with different setting capabilities. Upon changing between workpieces of different thickness, the circumferential wall and the cutout formed therein also have to be adapted in the height or vertical direction in order to maintain as small as possible a vertical gap dimension between the workpiece surface and cutout edge. The same goes in a corresponding manner in the event of a correction of the spacing between the drive unit and workpiece edge. If, for example, the radius of the tool is reduced during sharpening, this is associated with a reduction in diameter, as a consequence of which the spacing dimension has to be corrected. Since the hood is fastened to the drive unit, the cutout is also displaced, together with the drive unit, relative to the workpiece edge. Consequently, complicated correction of the cutout in the hood wall is also necessary in the depth direction.

SUMMARY OF THE INVENTION

It is an object of the invention to provide a machine tool wherein a reliable chip guidance is possible even in the case of varying operating conditions.

The machine tool of the invention is for the edge machining of a workpiece having an edge region. The machine tool includes: a rotary tool defining a vertical rotational axis; a drive unit for driving the rotary tool about the rotational axis; a guide for guiding the workpiece in a horizontal infeed direction so as to permit machining thereof by the rotary tool; a collecting hood for collecting chips generated by the machining of the workpiece; the guide including mutually opposite upper and lower pressure elements arranged in a vertical direction for contact engaging the workpiece; at least one of the upper and lower pressure elements being adjustable in the vertical direction relative to the other one of the upper and lower pressure elements as well as relative to the drive unit; the collecting hood having at least one side wall extending transversely to the horizontal infeed direction; the side wall having a cutout for accommodating the edge region of the workpiece to be machined; the side wall being made up of a base wall part fixedly positioned relative to the drive unit and a closure wall part fixedly positioned with respect to the one pressure element so as to be adjustable in the vertical direction therewith and to at least partially overlap the base wall part; and, the closure wall part delimiting the cutout at least in the vertical direction.

According to the invention, provision is made for the side wall of the chip collecting hood to be made up of a base wall part and at least one closure wall part, the base wall part being positioned fixedly relative to the drive unit, and the at least one closure wall part being positioned fixedly relative to the adjustable pressure element. The fixed relative positioning of the closure wall part is configured such that the closure wall part is settable, or adjustable in its position, in the vertical direction together with the associated pressure element and in the process at least partially overlaps the base wall part. Furthermore, the at least one closure wall part bounds the cutout for the edge region of the workpiece at least in the vertical direction.

This means, in other words, nothing more than that the closure wall part is adapted in shape and height position to a particular workpiece edge profile and is then fastened. As a result, a boundary of the cutout arises in the vertical direction with a fixedly defined gap dimension, measured in the vertical direction, between the cutout edge and workpiece surface. This gap dimension can be set in a suitable manner in order that the workpiece can pass through cleanly and without getting stuck and in order to bring about tightness with respect to chip escape that is as distinct as possible. If, now, during ongoing operation, a change has to be carried out between two or more different workpiece thicknesses, a corresponding height adaptation of the associated pressure element will take place. However, this height adaptation is associated also with height adaptation of the associated closure wall. Consequently, this ensures that the previously selected vertical gap dimension that is considered suitable is maintained automatically. Adaptation work on the extraction hood is not necessary. The overlap of the closure wall part with the base wall part ensures sufficient tightness against chip escape at this point, too, in spite of the multipart configuration. Overall, the adaptation complexity on changing between different workpiece thicknesses is limited to adaptation work on the particular pressure element of the guide device, without the hood as such having to be taken into consideration. Nevertheless, the collecting and guiding function of the chip collecting hood is fully retained upon changing between different workpiece thicknesses.

In practical operation, upon changing between different workpiece thicknesses, only one of the two pressure elements, specifically the upper pressure element, is set in terms of its height position. Accordingly, it may be sufficient also to fasten an above-described closure wall part only to this one pressure element. In a preferred embodiment of the invention, however, an upper closure wall and a lower closure wall part are provided, which each proportionately bound the cutout, the upper closure wall part being positioned fixedly relative to the upper pressure element and the lower closure wall part being positioned fixedly relative to the lower pressure element. As already described above, the designation "positioned fixedly" applies here inasmuch as relative positioning of the closure wall parts to the respectively associated pressure element has to be carried out only during the basic setup of the machine and is then no longer changed. If, however, in individual cases or as part of the machine setup, it is necessary to adapt the height also of the second, in this case of the lower pressure element, the same advantageous effects occur as in the setting of the upper pressure element, already described above. The same goes in a corresponding manner also when the position of the drive unit or the tool is adapted in the vertical axial direction, together with the hood part fastened thereto, relative to the workpiece edge. Vertical adaptation of the cutout in the side wall is not necessary, since the cutout geometry that has already been selected is maintained as a result of the closure wall parts.

In a preferred embodiment, the cutout for the edge region of the workpiece is also bounded toward the base wall part in a depth direction, perpendicular to the vertical direction and perpendicular to the infeed direction, by at least one closure wall part. As a result, it is possible for also the horizontal spacing between the tool drive and guide device or workpiece edge to be able to be corrected or set, without the gap dimension, measured in the depth direction and set as desired, between the cutout edge and workpiece edge changing.

It may be expedient for one closure wall part or the plurality of closure wall parts to be positioned on the outside of the base wall part connected fixedly to the drive unit. Preferably, however, the at least one or the two closure wall parts are arranged on that side of the base wall part that faces the interior of the chip collecting hood. This has the result that the free wall edge that is present in the interior as a result of the overlap exhibits as large a spacing as possible from the workpiece and thus from the point of origin of the chips. In conjunction with the resultant overlap direction, penetration of chips, dust or the like between the wall parts is avoided.

In an expedient variant, at least one horizontal cutting cover is provided and positioned fixedly relative to the pressure element such that it is settable in the vertical direction together with this pressure element. In particular, an upper horizontal cutting cover and a lower horizontal cutting cover are provided, the upper cutting cover being positioned fixedly relative to the upper pressure element, and the lower cutting cover being positioned fixedly relative to the lower pressure element. As a result of the horizontal extension, the cutting covers act as channeling guiding elements which favor controlled air guidance, which guide the chips, avoiding vertical spreading, and which favor effective chip extraction. The at least one or the two cutting covers maintain their relative position, set as desired, with respect to the workpiece surface. Changes in thickness or other changes with an influence on the assembly positioning have no influence on the spacing dimension between the cutting cover and workpiece surface. Chip and air guidance remain unchanged, and so these are retained in the desired quality.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
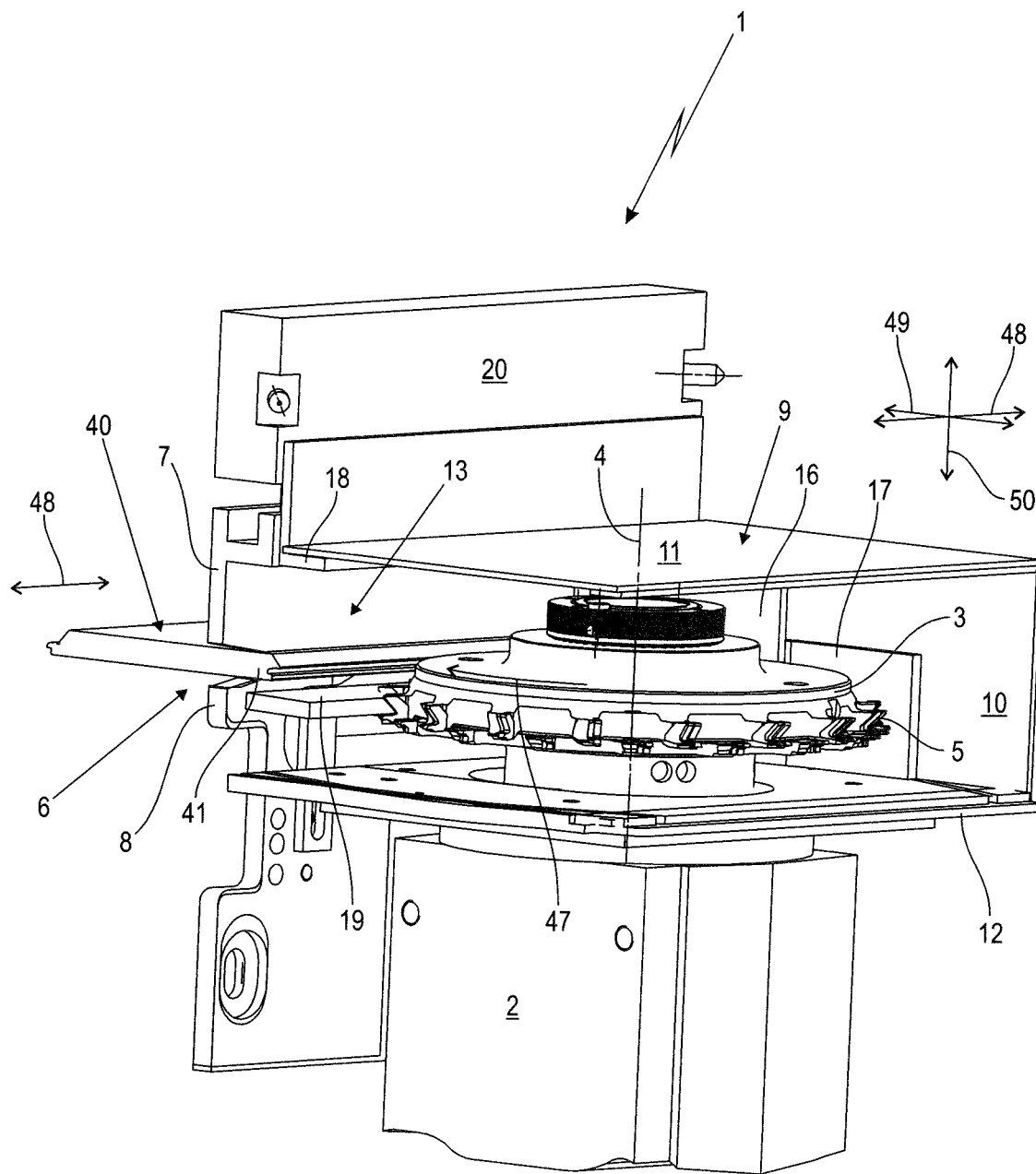
FIG. 1 shows a perspective internal view of a machine tool embodied according to the invention, with a workpiece which is guided in its edge region between two pressure elements, and with a multipart chip collecting hood.

FIG. 1 shows a perspective internal view of a machine tool 1 embodied according to the invention for the edge machining of a workpiece 40. The machine tool 1 is illustrated here in its normal operating position relative to a vertical direction 50, indicated by a double arrow, which for its part extends in the acting weight force direction. The workpiece 40 is positioned lying horizontally, that is, at right angles to the vertical direction 50, for the edge machining and is moved in a horizontal infeed direction 48 relative to a rotary tool 3 of the machine tool 1. Lying at right angles to the height direction 50 and also at right angles to the infeed direction 48 is a depth direction 49, which is likewise indicated by a double arrow.

The workpiece 40 is configured in a sheet-like manner for example, here. However, it may also be in the form of strips, slats, beams or the like, for example. Provided here as the material of the workpiece 40 are wood materials, wherein the term "wood material" includes, in addition to grown wood, also chipboard material or other fibrous material, for example of laminate flooring.

The machine tool 1 comprises a drive unit 2 with a vertical axis of rotation 4, that is, an axis of rotation extending parallel to the vertical direction 50. The drive unit 2 is an electric motor here. However, it can also be some other motor or only the transmission of a motor positioned at some other location. The rotary tool 3 driven in rotation about the vertical axis of rotation 4 by the drive unit 2 is configured here as a milling head. However, it can also be a circular saw blade or the like. In any case, the rotary tool 3 has a number of cutting edges 5 on its circumference. The direction of rotation of the rotary tool 3 is indicated by an arrow 47, according to which it extends in the clockwise direction when seen from above. The workpiece 40 has an edge region 41 which extends in the infeed direction 48 and which is machined by the machine tool 1. To this end, a guide device 6 is provided, by means of which the workpiece 40, to be more precise the edge region 41 of the workpiece 40 is moved along the circumferential region of the rotary tool 3 in the infeed direction 48 such that the edge region 41 comes into contact with the cutting edges 5 and is given its desired cross-sectional profile by chipping by the cutting edges 5. In FIG. 1, the workpiece 40 is moved to the left, that is, counter to the direction of rotation 47, in the infeed direction 48. Consequently, that portion of the edge region 41 that is located to the left of the engagement region with the cutting edges 5 has already undergone its profiling, and thus upcut milling is illustrated here. In the context of the invention, however, downcut milling is also possible, the infeed and direction of rotation then being in the same direction.

The guide device 6 for the workpiece 40 comprises two pressure elements 7, 8 located opposite one another in the vertical direction 50, specifically an upper pressure element 7 and a lower pressure element 8. The workpiece 40 rests on the lower pressure element 8. The upper pressure element 7 bears on the workpiece 40 from above and pushes the latter from above onto the lower pressure element 8. In this way, the edge region 41 of the workpiece 40 is fixed both in the vertical direction 50 and in the depth direction 49, but can be moved in the infeed direction 48 relative to the drive unit 2 or to the rotary tool 3. During the setup of the machine, relative positioning of the drive unit 2 with the tool 3 relative to the lower pressure element 8 takes place in the vertical direction 50 and in the depth direction 49, such that a particular desired profile of the edge region 41 arises in a particular relative position with respect to the workpiece 40 during chipping. For example, the wear-related re-grinding of the cutting edges 5 results in a reduction in the effective tool diameter, however, requiring position correction. For such position correction, the drive unit 2 with the rotary tool 3 is moved closer to the lower pressure element 8 in the depth direction 49. Of course, a height correction in the vertical direction 50 is also possible in a corresponding manner.

In practical operation, it may be necessary to machine workpieces 40 with changing thicknesses, but otherwise with the same milling profile. In this case, the position of the lower pressure element 8, of the drive unit 2 and of the rotary tool 3 remains unchanged, while only height setting or height adaptation of the upper pressure element 7 is carried out by means of a schematically indicated height adjuster 20.

As shown in FIG. 1, the region of the rotary tool 3 and the engagement thereof with the edge region 41 of the workpiece 40 is enclosed by a chip collecting hood 9. The chip collecting hood 9 has, in its direction facing the guide device 6 or the workpiece 40, an open side 13 and otherwise represents a closed housing. To this end, it comprises a top wall 11 positioned above the rotary tool 3 and a bottom 12 positioned beneath the rotary tool 3. Furthermore, it comprises at least one side wall 10, which is located here in the plane defined by the depth direction 49 and the vertical direction 50 and consequently extends transversely to the infeed direction 48. On the opposite side, facing the observer here, such a side wall is likewise provided. Although this is not illustrated here for greater clarity, it is embodied in the same way according to the invention. The following description of the side wall 10 illustrated in the drawing thus applies equally to the configuration according to the invention of the further side wall that is not illustrated. Otherwise, the chip collecting hood 9 comprises, on the front side located opposite the guide device 6, a wall which is not illustrated here, likewise for greater clarity. Finally, it should also be mentioned that the chip collecting hood 9 reaches with its open side 13 as far as the guide device 6. The open side 13 is covered by the guide device 6 or by the upper and lower pressure elements 7, 8, such that the interior of the chip collecting hood 9, in which the rotary tool 3 and the edge region 41 to be machined of the workpiece 40 are located, is closed off substantially hermetically.

Figure 2:
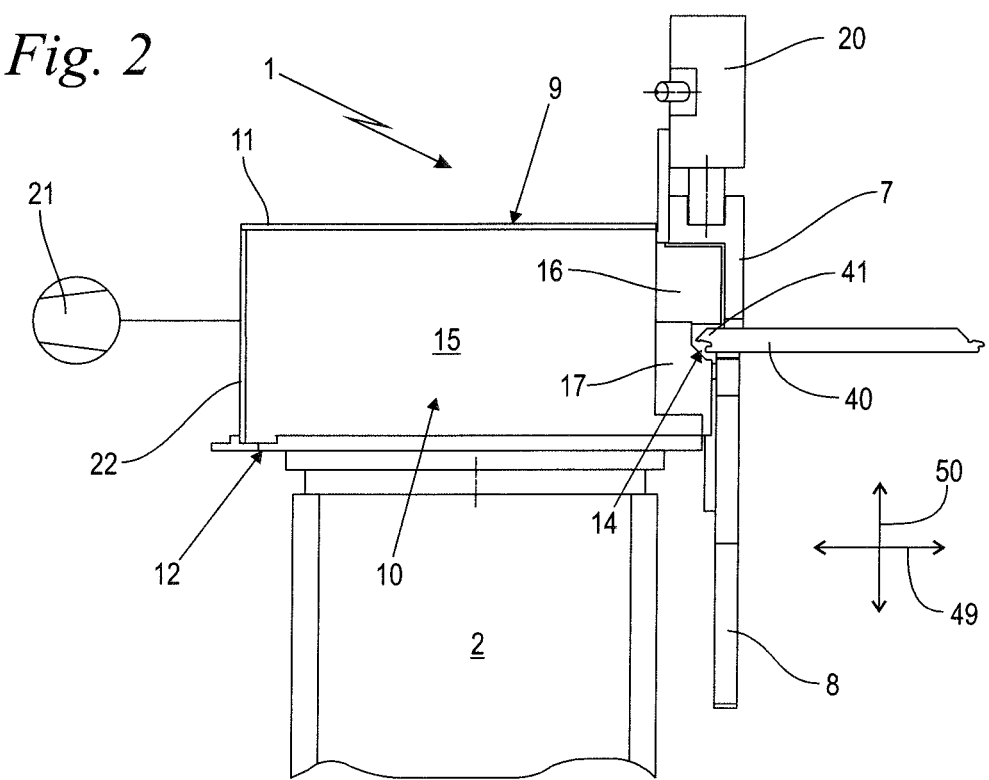
FIG. 2 shows an end-on view of the machine tool according to FIG. 1 with details of the side wall of the chip collecting hood, which comprises two closure wall parts fastened to the pressure elements; and, FIG. 3 shows the machine tool in the view according to FIG. 1 with the tool removed and with further details relating to the arrangement of the closure wall parts and of horizontal cutting covers.

FIG. 2 shows a side view of the machine tool 1 according to FIG. 1. Here, it is first of all shown that a schematically indicated suction fan 21, by means of which the chips that arise during the machining of the edge region 41 are extracted from the interior of the chip collecting hood 9, is connected to the interior of the chip collecting hood 9.

It is furthermore readily apparent from the side view according to FIG. 2 that the edge region 41 to be machined of the workpiece 40 is held between the two pressure elements 7, 8 and in the process protrudes into the interior of the chip collecting hood 9. Since the workpiece 40 is much longer in the infeed direction 48 (FIG. 1) than the lateral extent of the chip collecting hood 9, the side wall 10 of the chip collecting hood 9 is provided with a cutout 14 which receives the edge region 41 to be machined of the workpiece 40. The cutout 14 is adapted in terms of shape and size to the cross section of the edge region 41 such that a particular gap dimension of the desired size remains between the cutout edge and the workpiece surface.

In order to maintain the contour adaptation, achieved in such a way, of the cutout 14 to the cross section of the edge region 41 under the changing operating conditions described in connection with FIG. 1, a multipart configuration of the side wall 10 is provided according to the invention. The side wall 10 consists specifically of a base wall part 15 and at least one, in this case two closure wall parts 16, 17. The base wall part 15, the rear wall 22, the upper top wall 11 and the bottom 12 together form a hood main body of the chip collecting hood 9 and are fastened to the drive unit 2, that is, positioned fixedly relative to the latter. The abovementioned parts of the hood main body are thus adjusted together with the drive unit during an adjusting operation. In a variation, the upper closure wall part 16 is positioned fixedly relative to the upper pressure element 7 such that it is settable in the vertical direction 50, or is adjustable in its height position, together with the upper pressure element 7. In other words, the upper pressure element 7 and the upper closure wall part 16 form a structural unit, the height position of which is set jointly in the vertical direction 50 upon actuation of the height adjuster 20. To this end, the upper closure wall part 16 can be screwed for example fixedly to the upper pressure element 7. However, within the scope of the invention, such a connection between the closure wall part 16 and the upper pressure element 7 is also possible such that a relative movement between the upper pressure element 7 and the upper closure wall part 16 is possible in the infeed direction 48 (FIG. 1). The upper pressure element 7 can then be moved in the infeed direction 48 (FIG. 1) together with the workpiece 40, while the closure wall part 16 maintains its position in the infeed direction 48 (FIG. 1). Joint adjustment then takes place only in the vertical direction 50.

Optionally, in the embodiment shown, the second, in this case lower closure wall part 17 is provided, which is connected, analogously to the upper closure wall part 16, to the associated, in this case lower pressure element 8 such that it is positioned fixedly relative to the latter. In the event of position adjustment of the drive unit 2 together with the abovementioned hood main body and/or of the upper pressure element 7 together with the upper closure wall 16, the structural unit made up of the lower pressure element 8 and the lower closure wall 17 maintains its position. Conversely, during position adjustment of the lower pressure element 8, the lower closure wall part 17 is also adjusted in the same way.

Figure 3:
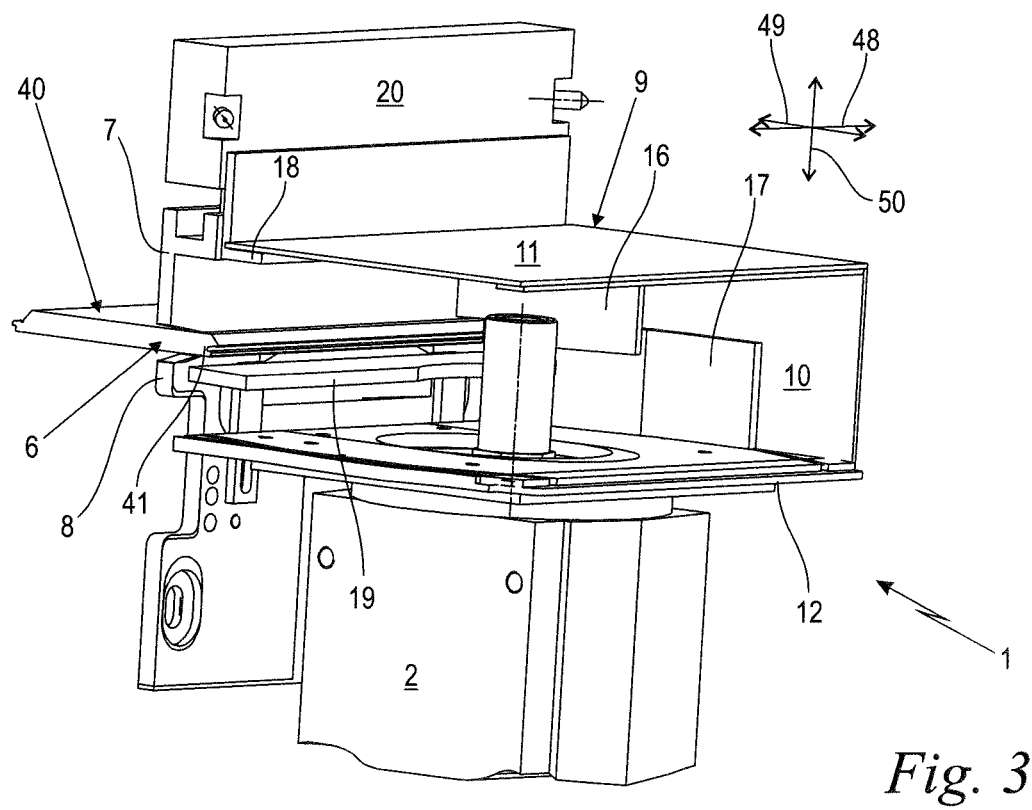

The two closure wall parts 16, 17 overlap one another and each also at least partially overlap the base wall part 15, as is additionally shown in FIG. 3. Furthermore, it is apparent from FIG. 2 that the upper closure wall part 16 bounds the cutout 14 upwardly in the vertical direction 50 with its lower edge. The lower closure wall part 17 has such an edge profile that it bounds the cutout 14 downwardly in the vertical direction 50 and furthermore also in the depth direction 49 toward the base wall part 15. Of course, an analogous configuration of the upper closure wall part 16 is also possible such that the latter, in combination or as an alternative to the lower closure wall part 17, bounds the cutout 14 toward the base wall part 15 in the depth direction 49. In the preferred embodiment shown, the cutout 14 is thus enclosed only by edges of the closure wall parts 16, 17, without the base wall part 15 playing a role here. If, therefore, a workpiece 40 with a greater or smaller thickness is intended to be machined, the upper pressure element 7 is raised or lowered in the vertical direction 50, together with the upper closure wall part 16, by the dimension of the change in thickness. In the process, the vertical edge spacing of the closure wall part 16 with respect to the surface of the workpiece 40 is retained in the region of the cutout 14. Furthermore, the position of the drive unit 2 together with the rotary tool 3 (FIG. 1) in the depth direction 49 relative to the functional unit made up of the two pressure elements 7, 8 and the workpiece 40 guided therebetween can be corrected or set. However, a change in position associated therewith concerns only the base wall part 15 of the side wall 10, but not the two closure wall parts 16, 17. Thus, the gap dimension measured in the horizontal depth direction 49, or the horizontal edge spacing between the closure wall parts 16, 17 and the workpiece 40 is retained in the region of the cutout 14.

Overall, what is achieved is that, irrespective of all possible setting and adaptation operations, the selected adaptation of the shape of the cutout 14 to the cross section of the edge region 41 of the workpiece 40 is retained. No replacement parts or format parts are required. Nevertheless, the gap dimension between the cutout edge and the workpiece surface can be kept small enough that virtually no chips escape from the interior of the chip collecting hood 9. This is achieved not only in the comparatively non-critical state of upcut milling according to FIG. 1, in which case the chips are then flung toward the right, at an oblique angle to the workpiece edge, against the region of the right-hand closure wall parts 16, 17. Rather, the sealing action is retained even in downcut operation, when the chips that have just been removed are flung away tangentially and parallel to the workpiece edge, directly toward the cutout 14.

FIG. 3 shows the machine tool 1 according to FIGS. 1 and 2 in the perspective view according to FIG. 1 but with the rotary tool 3 removed. It can be seen here that the two closure wall parts 16, 17 are arranged on that side of the base wall part 15 that faces the interior of the chip collecting hood 9. On this inner side, they overlap the base wall part 15 without a gap. Furthermore, they overlap one another in the vertical direction 50 such that a closed side wall 10 is formed overall. Of course, however, it is also possible to arrange one of the two closure wall parts 16, 17 or even both closure wall parts 16, 17 on the outer side of the base wall part 15.

It is also clear from viewing FIGS. 1 and 3 together that the machine tool 1 has, at least in the interior of the chip collecting hood 9, a horizontal cutting cover 18, 19. In the preferred embodiment shown, an upper horizontal cutting cover 18 and a lower horizontal cutting cover 19 are provided. Analogously to the above-described closure wall parts 16, 17, the upper cutting cover 18 is positioned fixedly relative to the upper pressure element, while the lower cutting cover 19 is positioned fixedly relative to the lower pressure element. Irrespective of all the setting operations already described above, the cutting covers 18, 19 retain their predefined relative position with respect to the workpiece surface as a result. In the specific configuration, the horizontal cutting covers 18, 19 are formed by flat elements which each extend in the horizontal plane defined by the infeed direction 48 and the depth direction 49 and are thus parallel to the flat sides of the workpiece 40. Between the two horizontal cutting covers 18, 19, the rotary tool 3 rotates during operation such that the chips produced thereby can be guided between the two cutting covers 18, 19 and fed in a controlled manner to the suction fan 21 (FIG. 2). In particular the vertical spacing of the two cutting covers 18, 19 with respect to the workpiece surface remains the same even when workpieces 40 of different thicknesses are machined, such that the chip guiding action also remains unchanged.

In the specific configuration, an L-shaped profile is provided for the upper cutting cover 18, the horizontal leg of which engages under the upper top wall 11 into the interior of the chip collecting hood 9 and forms the upper cutting cover 18. The vertical leg of the L-shaped profile covers the gap region between the height adjuster 20 and the upper pressure element 7, specifically irrespective of the corresponding set height position of the upper pressure element 7. The horizontal leg forming the upper cutting cover 18 is illustrated here such that it is located immediately beneath the upper top wall 11. However, it can also be positioned further down, closer to the workpiece 40. In the case of the lower cutting cover 19, a horizontal guide plate is provided, which is fastened to the lower pressure element 8 by means of screw-on brackets, or is screwed thereto. Otherwise, the lower closure wall part 17 is fixedly connected to the lower cutting cover 19, while the upper closure wall part 16 is fixedly connected to the upper cutting cover 18, such that, in this regard, the same relative positioning is always maintained.

It was already mentioned at the beginning that the multipart configuration applies equally for the one side wall 10 shown here and for the opposite side wall that is not illustrated here. However, in the context of the invention, it may be sufficient to configure only one side wall 10 in the manner according to the invention, it then preferably being that side wall 10 that is located immediately behind the engagement region between the rotary tool 3 and the workpiece 40 with regard to the direction of rotation 47, and which is thus reached directly by the stream of chips that are produced. On the opposite side, which is subjected to fewer chips, a different wall construction may be sufficient.

It is understood that the foregoing description is that of the preferred embodiments of the invention and that various changes and modifications may be made thereto without departing from the spirit and scope of the invention as defined in the appended claims.

What is claimed is:

1. A machine tool for the edge machining of a workpiece having an edge region, the machine tool comprising:
    a rotary tool defining a vertical rotational axis; a drive unit for driving said rotary tool about said rotational axis;
    a guide for guiding the workpiece in a horizontal infeed direction so as to permit machining thereof by said rotary tool;
    a collecting hood for collecting chips generated by the machining of the workpiece;
    said guide including mutually opposite upper and lower pressure elements arranged in a vertical direction for contact engaging the workpiece;
    at least one of said upper and lower pressure elements being an adjustable pressure element adjustable in said vertical direction relative to the other one of said upper and lower pressure elements as well as relative to said drive unit;
    said collecting hood having at least one side wall extending transversely to said horizontal infeed direction;
    said side wall having a cutout for accommodating the edge region of the workpiece to be machined;
    said side wall being made up of a base wall part fixedly positioned relative to said drive unit and a closure wall part fixedly positioned with respect to said adjustable pressure element so as to be adjustable in said vertical direction therewith and to at least partially overlap said base wall part; and,
    said closure wall part delimiting said cutout at least in said vertical direction.

2. The machine tool of claim 1, wherein said closure wall part is a lower closure wall part; and, wherein said machine tool further comprises an upper closure wall part; said lower closure wall part and said upper closure wall part conjointly delimit said cutout; and, said upper closure wall part is fixedly positioned relative to said upper pressure element and said lower closure wall part is fixedly positioned relative to said lower pressure element.

3. The machine tool of claim 1, wherein said closure wall part delimits said cutout toward said base wall part in a direction lying perpendicular to said vertical direction and perpendicular to said infeed direction.

4. The machine tool of claim 1, wherein said collecting hood defines an interior space and said base wall part has a side facing toward said interior space; and, said closure wall part is arranged on said side of said base wall part.

5. The machine tool of claim 1, further comprising at least one horizontal cutting cover fixedly positioned relative to said one of said pressure elements so as to be adjustable in said vertical direction in common therewith.

6. The machine tool of claim 1, further comprising:
    an upper horizontal cutting cover and a lower horizontal cutting cover;
    said upper horizontal cutting cover being fixedly positioned relative to said upper pressure element; and,
    said lower horizontal cutting cover being fixedly positioned relative to said lower pressure element.

* * * * *